(12) United States Patent
Hoff

(10) Patent No.: US 11,175,802 B2
(45) Date of Patent: Nov. 16, 2021

(54) CONFIGURATION OBJECT DELETION MANAGER

(71) Applicant: SAP SE, Walldorf (DE)

(72) Inventor: Roland Hoff, Walldorf (DE)

(73) Assignee: SAP SE, Walldorf (DE)

( * ) Notice: Subject to any disclaimer, the term of this patent is extended or adjusted under 35 U.S.C. 154(b) by 80 days.

(21) Appl. No.: 16/138,107

(22) Filed: Sep. 21, 2018

(65) Prior Publication Data

US 2020/0097146 A1 Mar. 26, 2020

(51) Int. Cl.
| | |
|---|---|
| *G06F 11/30* | (2006.01) |
| *G06F 3/0484* | (2013.01) |
| *G06F 9/445* | (2018.01) |

(52) U.S. Cl.
CPC ........ *G06F 3/0484* (2013.01); *G06F 9/44505* (2013.01); *G06F 11/3051* (2013.01)

(58) Field of Classification Search
CPC ...... G06F 8/71; G06F 16/211; G06F 16/2477; G06F 9/5077; G06F 3/0605; G06F 8/34; G06F 9/451; G06F 16/178; G06F 16/256; G06F 3/067; G06F 9/5027; G06F 9/542; G06F 11/1438; G06F 16/285; G06F 16/289; G06F 1/12; G06F 9/44505; G06F 9/546; G06F 9/465; G06F 11/3414; G06F 11/3672; G06F 16/00; G06F 16/252; G06F 2209/544; G06F 2209/547; G06F 3/04817; G06F 8/60; G06F 8/65; G06F 16/23; G06F 3/0484; G06F 11/3051; H04W 24/10; H04W 8/26; H04W 48/16; H04W 88/06; G06Q 10/00; G06Q 10/063; G06Q 10/101; G06Q 40/00; G06Q 40/02; G06Q 40/04; G06Q 40/123; H04L 69/08; H04L 41/0806; H04L 41/0866; H04L 41/5061; H04L 12/4679; H04L 41/06; H04L 41/0853; H04L 41/0859; H04L 67/02; H04L 67/2809; H04L 67/2814; H04L 67/2819; H04L 67/16

See application file for complete search history.

(56) References Cited

U.S. PATENT DOCUMENTS

| | | | | |
|---|---|---|---|---|
| 4,809,168 | A | * | 2/1989 | Hennessy ............... G06F 9/466 710/200 |
| 5,297,283 | A | * | 3/1994 | Kelly, Jr. ................ G06F 9/468 718/104 |

(Continued)

OTHER PUBLICATIONS

Gal Badishi et al., Deleting Files in the Celeste Peer-to-Peer Storage System, 2006, 25th IEEE Symposium on Reliable Distributed Systems (SRDS'06), pp. 1-10 (Year: 2006).*

(Continued)

*Primary Examiner* — Di Xiao
(74) *Attorney, Agent, or Firm* — Erise IP, P.A.

(57) ABSTRACT

User-generated input is received that triggers deletion of a configuration object used by a computing system. In response, all active processes using the configuration object are identified so that subsequently initiated processes are prevented from using the configuration object. It is then determined when all active processes using the configuration object have completed. In response to such determination, the configuration object is deleted. Related apparatus, systems, techniques and articles are also described.

20 Claims, 7 Drawing Sheets

(56) References Cited

U.S. PATENT DOCUMENTS

| Patent/Pub. No. | | Date | Inventor | Classification |
|---|---|---|---|---|
| 5,475,817 | A * | 12/1995 | Waldo | G06F 9/465 719/316 |
| 5,996,009 | A * | 11/1999 | Kitamura | H04L 41/0803 707/999.01 |
| 6,073,109 | A * | 6/2000 | Flores | G06Q 10/10 705/7.13 |
| 6,161,147 | A * | 12/2000 | Snyder | G06F 9/465 719/310 |
| 6,247,039 | B1 * | 6/2001 | Callsen | G06F 9/52 379/355.09 |
| 6,473,806 | B1 * | 10/2002 | Snyder | G06F 9/465 718/104 |
| 6,519,652 | B1 * | 2/2003 | Sadiq | G06F 16/289 719/316 |
| 6,639,687 | B1 * | 10/2003 | Neilsen | G06F 11/0715 358/1.1 |
| 6,643,652 | B2 * | 11/2003 | Helgeson | G06F 16/258 |
| 6,704,737 | B1 * | 3/2004 | Nixon | G05B 19/4145 707/656 |
| 6,842,898 | B1 * | 1/2005 | Carlson | G06F 11/0715 714/E11.003 |
| 6,983,317 | B1 * | 1/2006 | Bishop | H04L 41/065 709/223 |
| 7,206,843 | B1 * | 4/2007 | Allavarpu | H04L 41/00 709/223 |
| 7,565,406 | B2 * | 7/2009 | E | G06F 9/526 707/999.008 |
| 7,584,155 | B1 * | 9/2009 | Carter, III | G06Q 10/063 705/400 |
| 7,657,855 | B1 * | 2/2010 | Manaker, Jr. | G06F 17/5031 716/103 |
| 7,805,706 | B1 * | 9/2010 | Ly | G06F 9/5083 717/121 |
| 7,831,561 | B2 * | 11/2010 | Wertheimer | G06F 11/1458 707/640 |
| 7,865,578 | B1 * | 1/2011 | Gerraty | H04L 12/40013 709/220 |
| 7,945,671 | B2 * | 5/2011 | Mohindra | H04L 67/16 709/226 |
| 7,996,828 | B2 * | 8/2011 | Massmann | G06F 9/44505 715/825 |
| 8,090,754 | B2 * | 1/2012 | Schmidt | G06F 16/284 707/726 |
| 8,224,828 | B2 * | 7/2012 | Figus | G06F 16/284 707/756 |
| 8,677,318 | B2 * | 3/2014 | Mohindra | G06F 9/5055 717/121 |
| 8,739,124 | B2 * | 5/2014 | Ritter | G06F 8/36 717/100 |
| 8,751,626 | B2 * | 6/2014 | Pinkston | G06F 8/20 709/224 |
| 8,930,942 | B2 * | 1/2015 | Vorthmann | G06F 8/60 717/177 |
| 8,935,371 | B2 * | 1/2015 | Gebhart | G06F 9/485 709/223 |
| 9,002,805 | B1 * | 4/2015 | Barber | G06F 16/215 707/692 |
| 9,047,312 | B1 * | 6/2015 | Ten-Pow | G06F 16/174 |
| 9,052,942 | B1 * | 6/2015 | Barber | G06F 3/0604 |
| 9,170,926 | B1 * | 10/2015 | Cohen | G06F 9/44505 |
| 9,436,503 | B2 * | 9/2016 | Kogge | G06F 9/4843 |
| 9,594,762 | B2 * | 3/2017 | Chakra | G06F 16/16 |
| 10,620,933 | B2 * | 4/2020 | Banford | G06F 8/658 |
| 10,740,090 | B2 * | 8/2020 | Price | G06F 8/65 |
| 2002/0029357 | A1 * | 3/2002 | Charnell | G06F 8/4442 714/5.11 |
| 2003/0004952 | A1 * | 1/2003 | Nixon | G05B 19/4145 |
| 2003/0069951 | A1 * | 4/2003 | Fong | H04L 29/06 709/222 |
| 2004/0006589 | A1 * | 1/2004 | Maconi | G06F 9/4862 709/202 |
| 2004/0064458 | A1 * | 4/2004 | Hagarty | G06F 16/252 |
| 2004/0117600 | A1 * | 6/2004 | Bodas | H04L 29/06 712/210 |
| 2005/0033764 | A1 * | 2/2005 | Reid | G06F 8/34 |
| 2005/0131870 | A1 * | 6/2005 | Krishnaswamy | G06F 8/71 |
| 2005/0222851 | A1 * | 10/2005 | Dubey | G06Q 10/06 717/100 |
| 2006/0112173 | A1 * | 5/2006 | Cohn | G06F 3/0605 709/220 |
| 2006/0225032 | A1 * | 10/2006 | Klerk | G06F 8/10 717/105 |
| 2006/0293935 | A1 * | 12/2006 | Tsyganskiy | G06Q 10/06375 705/7.29 |
| 2007/0033204 | A1 * | 2/2007 | Callahan | G06F 17/50 |
| 2007/0033325 | A1 * | 2/2007 | Sinclair | G06F 3/0605 711/103 |
| 2007/0150783 | A1 * | 6/2007 | Hess | G06F 9/451 714/742 |
| 2007/0236493 | A1 * | 10/2007 | Horiuchi | H04N 13/341 345/419 |
| 2007/0294668 | A1 * | 12/2007 | Mohindra | G06F 9/5038 717/120 |
| 2008/0082959 | A1 * | 4/2008 | Fowler | G06F 9/44505 717/104 |
| 2008/0120129 | A1 * | 5/2008 | Seubert | G06Q 10/06 705/35 |
| 2008/0195964 | A1 * | 8/2008 | Randell | G06Q 10/06 715/772 |
| 2008/0235611 | A1 * | 9/2008 | Fraley | G06F 9/44505 715/772 |
| 2009/0172134 | A1 * | 7/2009 | Sterling | G06Q 10/06 709/220 |
| 2009/0177684 | A1 * | 7/2009 | Williamson | G06F 9/44505 |
| 2009/0271586 | A1 * | 10/2009 | Shaath | G06F 12/1466 711/163 |
| 2009/0282457 | A1 * | 11/2009 | Govindavajhala | G06F 21/577 726/1 |
| 2010/0057780 | A1 * | 3/2010 | Isobe | G06F 8/71 707/E17.045 |
| 2010/0161364 | A1 * | 6/2010 | Lokowandt | G06Q 10/0631 705/7.12 |
| 2010/0161365 | A1 * | 6/2010 | Lokowandt | G06Q 10/087 705/7.31 |
| 2010/0217751 | A1 * | 8/2010 | Ciubotaru | G06F 16/162 707/650 |
| 2011/0087854 | A1 * | 4/2011 | Rushworth | G06F 9/5016 711/170 |
| 2011/0185404 | A1 * | 7/2011 | DeCusatis | G06F 21/31 726/6 |
| 2013/0024226 | A1 * | 1/2013 | Bourke | G06Q 10/06 705/7.12 |
| 2013/0238384 | A1 * | 9/2013 | Caesar | G06F 8/34 705/7.27 |
| 2013/0297755 | A1 * | 11/2013 | Ritvanen | H04L 41/0233 709/220 |
| 2014/0046645 | A1 * | 2/2014 | White | H04L 41/145 703/13 |
| 2014/0157154 | A1 * | 6/2014 | Brunswig | G06Q 10/06 715/762 |
| 2014/0223440 | A1 * | 8/2014 | Orschel | G06F 9/4843 718/102 |
| 2014/0325654 | A1 * | 10/2014 | Denis | G06F 21/567 726/24 |
| 2015/0317385 | A1 * | 11/2015 | Zhang | G06F 3/04845 707/805 |
| 2016/0048538 | A1 * | 2/2016 | Zhang | G06F 16/211 707/803 |
| 2016/0092463 | A1 * | 3/2016 | Vijayan | G06F 3/0665 707/626 |
| 2016/0179850 | A1 * | 6/2016 | Martin | G06F 16/214 707/634 |
| 2016/0321072 | A1 * | 11/2016 | Cannata | G06F 9/3009 |
| 2016/0378311 | A1 * | 12/2016 | Kim | G06F 3/04845 715/769 |
| 2017/0004054 | A1 * | 1/2017 | Pawar | G06F 11/1474 |
| 2017/0177877 | A1 * | 6/2017 | Suarez | G06F 16/188 |
| 2017/0351985 | A1 * | 12/2017 | Soloway | G06Q 10/0637 |

(56) References Cited

U.S. PATENT DOCUMENTS

| | | | |
|---|---|---|---|
| 2017/0366532 A1* | 12/2017 | Garfinkle | H04L 63/061 |
| 2018/0046339 A1* | 2/2018 | Naidoo | G06F 3/0484 |
| 2018/0063350 A1* | 3/2018 | Kodama | H04N 1/00928 |
| 2018/0253440 A1* | 9/2018 | Levesque | G06F 16/168 |
| 2019/0004505 A1* | 1/2019 | Joshi | G05B 19/41885 |
| 2020/0380437 A1* | 12/2020 | Jin | G06Q 10/06 |

OTHER PUBLICATIONS

Stanley T. Chang et al., A Network Approach to Parallel Discrete Event Simulation, 1993, IEEE Xplore, pp. 280-286 (Year: 1993).*

M. Raack, "Okeanos: Reconfigurable fault-tolerant transactional storage supporting object deletions," 2010 International Conference on High Performance Computing, Goa, India, 2010, pp. 1-10, doi: 10.1109/HIPC.2010.5713181. (Year: 2010).*

J. Kramer, J. Magee and A. Young, "Towards unifying fault and change management," [1990] Proceedings. Second IEEE Workshop on Future Trends of Distributed Computing Systems, Cairo, Egypt, 1990, pp. 57-63, doi: 10.1109/FTDCS.1990.138295. (Year: 1990).*

* cited by examiner

CONFIGURATION OBJECT DELETION MANAGER

TECHNICAL FIELD

The subject matter described herein relates to the deletion of configuration objects used in software systems implementing complex processes.

BACKGROUND

Complex computing architectures are increasingly utilizing cloud-based, on-premise systems, and combinations of both to implement and orchestrate complex computer-implemented processes involving numerous data objects. To configure such processes, specialized data objects (referred to herein as configuration objects) specify or otherwise control how such processes are executed (including, for example, which data objects are utilized by such processes). With large-scale implementations, there can be thousands of configuration objects.

SUMMARY

In one aspect, user-generated input is received that triggers deletion of a configuration object used by a computing system. In response, all active processes using the configuration object are identified so that subsequently initiated processes are prevented from using the configuration object. It is then determined when all active processes using the configuration object have completed. In response to such determination, the configuration object is deleted.

The subsequently initiated processes can be prevented from using the configuration object by changing at least one component of the configuration object that is used as a starting point for processes to prevent further processes from initiating.

A process scanner can be periodically called to determine whether any of the active processes are still executing. The configuration object can be deleted when it is determined that there are no active processes.

The computing system can include a plurality of computers and at least one database.

The identifying, preventing, and determining can form part of a pre-deletion phase is provided, in which it is guaranteed that no related processes can be started and that all actively executed processes can be finalized. These operations can, for example, be executed by a configuration framework. The configuration framework can include a deletion process manager that is configured to selectively delete the configuration objects. In addition, the configuration framework can include a business process manager to manage and monitor the execution of the processes.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. In particular, the current subject matter is advantageous in that it efficiently deletes selective configuration objects even when there are currently active processes. In particular, the current subject matter provides a systematic and highly automated approach to delete configuration objects that are frequently used by various business processes. Without the current innovations, deletion of such configuration objects requires highly specialized experts to define a deletion process for a given configuration object.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to the selective deletion of configuration objects used by advanced computing systems for the control of processes. As noted above, if configuration objects are used in processes (e.g. to control such processes), and if the existence of these configuration objects is needed during the execution of the process, it is often difficult or impossible to directly delete such configuration objects if the processes have already commenced. Furthermore, if the related processes have long processing times, or if the process execution time can be prolonged, and/or if such processes are often used, then it is nearly not possible to wait until all such related processes are finalized in order to delete some or all of the underlying configuration objects. This restriction is based on the fact that if related processes are finalized, other processes may have subsequently started. Therefore, there can be situations in which there is never a period of time during which all processes are finalized utilized by a particular configuration object without new related processes being started.

With the current subject matter, for every configuration object a pre-deletion phase is provided, in which it is guaranteed, on one hand side, that no related process can be started and, on the other hand, all actively executed processes can be finalized. With such an arrangement, a deletion process can utilize such pre-deletion phase to ensure that configuration objects are accurately and efficiently deleted.

As an example, a regular automatic job can check the finalization-status of all already started related processes to determine if a corresponding configuration object or objects can be deleted. If all such processes are finalized, then there are two possibilities (i) the configuration object can be deleted automatically by the job or (ii) a flag or other indicator can be written for the to-be-deleted configuration object, which marks it as finally deletable. Further, for example, a workflow or any other information flow can be triggered to inform (i.e., transmit data, display data, send alert, etc.) the responsible experts for the to-be-deleted configuration object and/or for the related processes about this status. Thereafter, such experts can check and decide for the final and complete deletion of the configuration object.

As provided herein, the deletion process can include a pre-deletion phase (also referred to sometimes as obsolete phase). In this pre-deletion phase, no process (or variant of process) which requires the to-be-deleted configuration object can be created or subsequently started. Components in the configuration objects to be deleted. Such components control the starting points of related points of related processes. The definition and all other components of the to-be-deleted configuration object are not changed and, in most cases, all related and currently executing processes can be finalized.

Figure 1A:
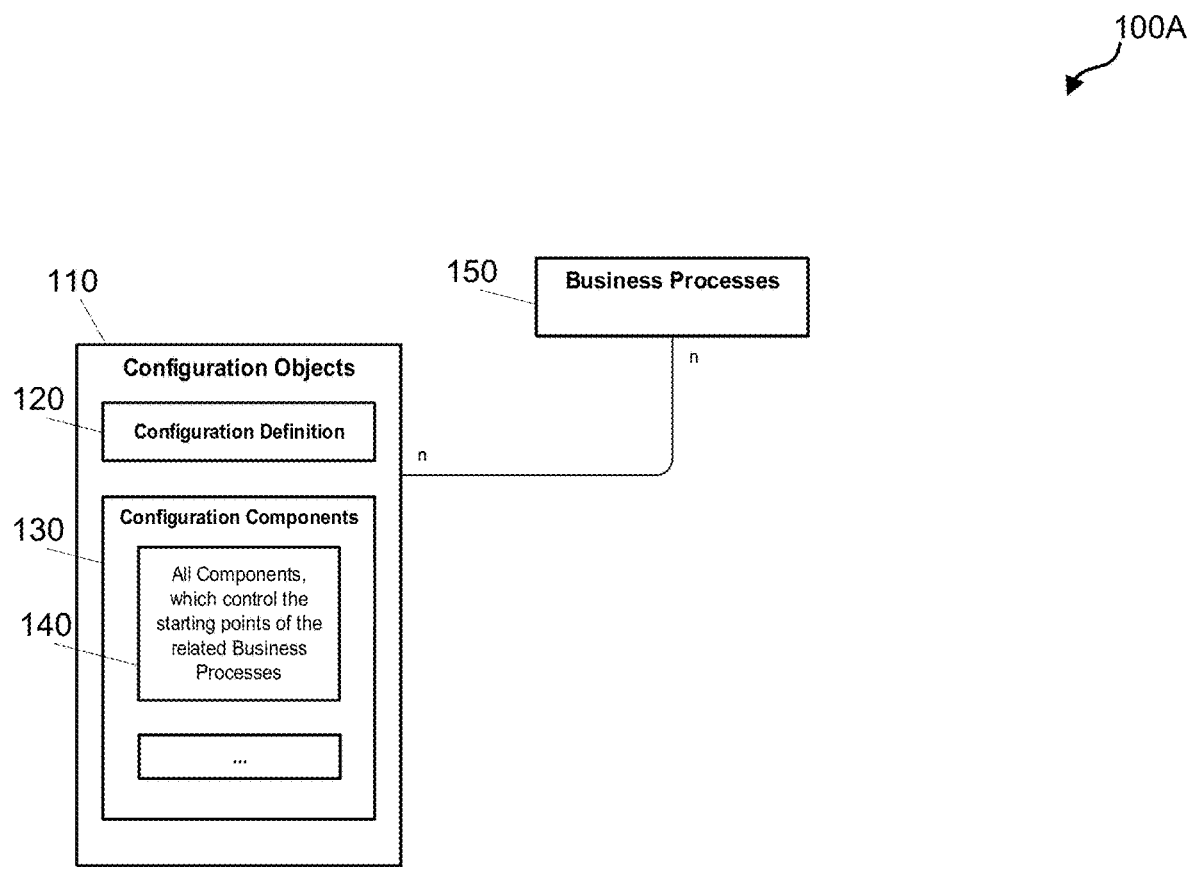
FIG. 1A is a diagram illustrating a configuration object and related processes.
Figure 1B:
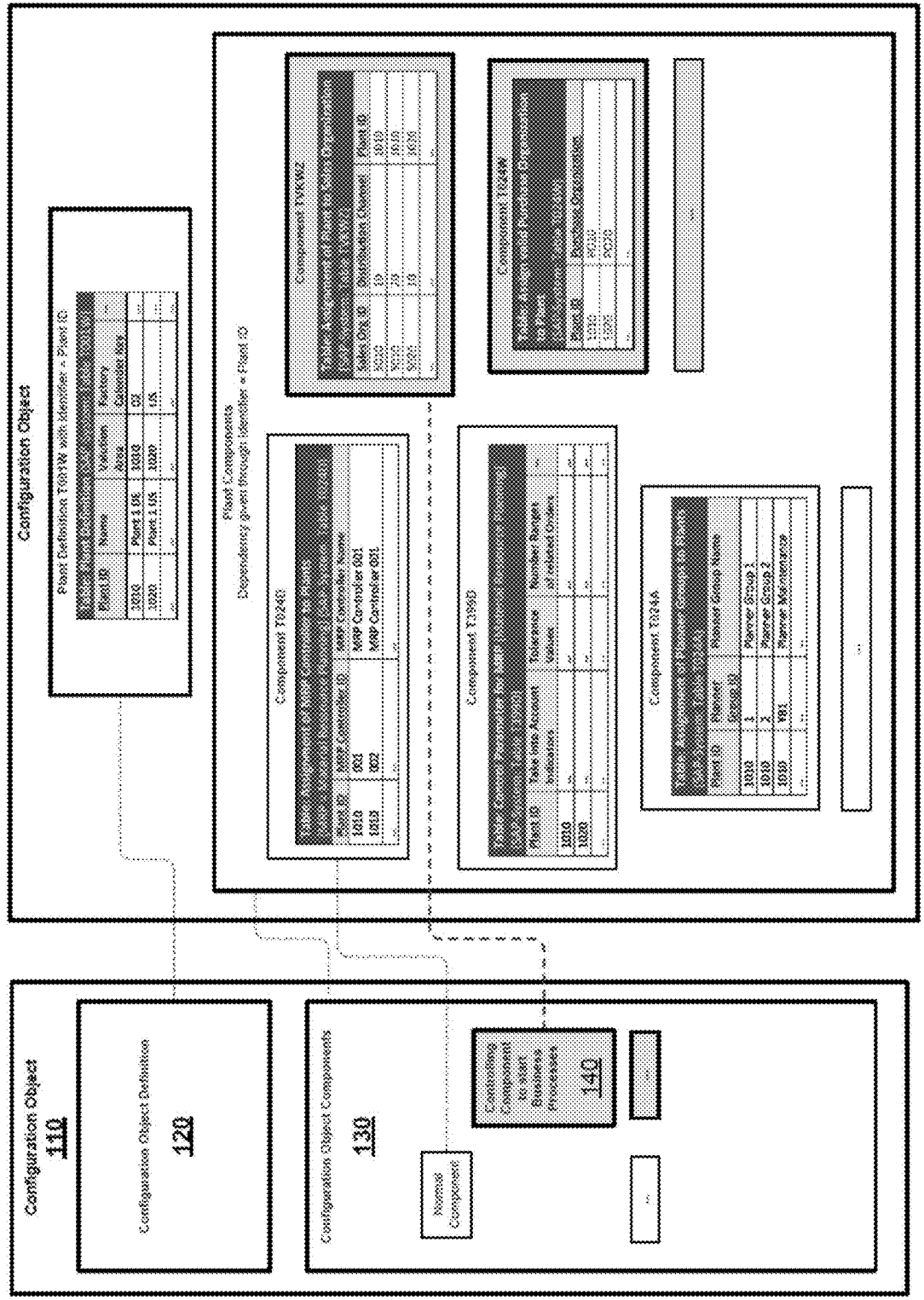
FIG. 1B is a diagram illustrating a sample configuration object relating to a plant.

FIGS. 1A and 1B are diagrams 100A, 100B illustrating different views of a configuration object 110 which can be utilized by one or more business processes 150. The configuration objects 110 can include a configuration definition 120 that can define an identifier, or more generally, a key-field structure of the configuration object 110 in order to specify which fields uniquely define an instance of the configuration object 110. The configuration definition 120 can also define important attributes which classify the configuration object 110. For example, the configuration definition 120 can specify an identifier of the configuration object 110. This identifier can be unique to every instance of the configuration object 110 such that one instance of the configuration object 110 corresponds to one record in a table in the configuration object definition 120. Further, the configuration object 110 can include various configuration components 130. These configuration components 130 can take various forms. Every configuration component 130 can depend on the corresponding configuration object definition 120. Such dependency can typically be provided by way of the identifier of the configuration object 110. As will be described in further detail below, certain of the configuration components 140 can control starting points of related business processes. Such configuration components 140 can, for example, be a general controlling configuration to start the related business process and/or an authorization configuration that defines which roles can start the corresponding business process.

One example configuration component 140 is Plant Component T024D. Such configuration component 140 can define a materials resource planning (MRP) controller identification inside a given plant. The MRP controller is a person or a group of persons responsible for monitoring material availability. The MRP controller ID entered here, can be used for example, to select the planning results per MRP controller. Every material that is relevant to the planning run must be assigned an MRP controller number in the material master record.

Another example configuration component 140 is Plant Component TVKWZ. Such configuration component 140 can be used to assign combination of sales organizations and distribution channels to a plant. This assignment is the base and prerequisite for the plant determination for products in any kind of sales orders. This configuration component 140 can be used to assign any number of plants to a combination of sales organization and distribution channels. A plant can be assigned more than once.

Another example configuration component 140 is Plant Component T399D. This configuration component 140 can contain the Assignment of multiple MRP control parameters to plants. These parameters can include "Rescheduling includes: Firmed PL Orders" which includes an indicator that firmed planned orders are taken into account in the rescheduling check. Such parameter can include dependencies such that this indicator is only valid when bringing forward (rescheduling in) receipt elements. When postponing (rescheduling out), all firmed receipt elements are checked irrespective of whether they are selected here or not.

Another example parameter can include "Tolerance Value Forward" which specifies a tolerance value for bringing forward receipt elements. For example, the number of workdays used by the system to create a rescheduling proposal in the planning run to bring forward a firm receipt element that lies after the requirements date. The system compares this value with the number of days which results from calculating the difference between the requirements date and the delivery/order finish date. If the difference is greater than the comparison value, the system provides the receipt elements in question with an exception message and a rescheduling proposal that is based on the requirements date.

Yet another parameter can be used to assign IDs of number range definitions to control the possible numbers of the according orders, such as MRP-Lists, Planned Orders, Purchase Requisitions, and the like.

Yet another example configuration component 140 is plant Component T024 W which can be used to assign a purchasing organization to a plant. Various options can be provided, for example, one purchasing organization procures for one plant (this is plant-specific purchasing), one purchasing organization procures for several plants, and/or several purchasing organizations procure for one plant.

Figure 2:
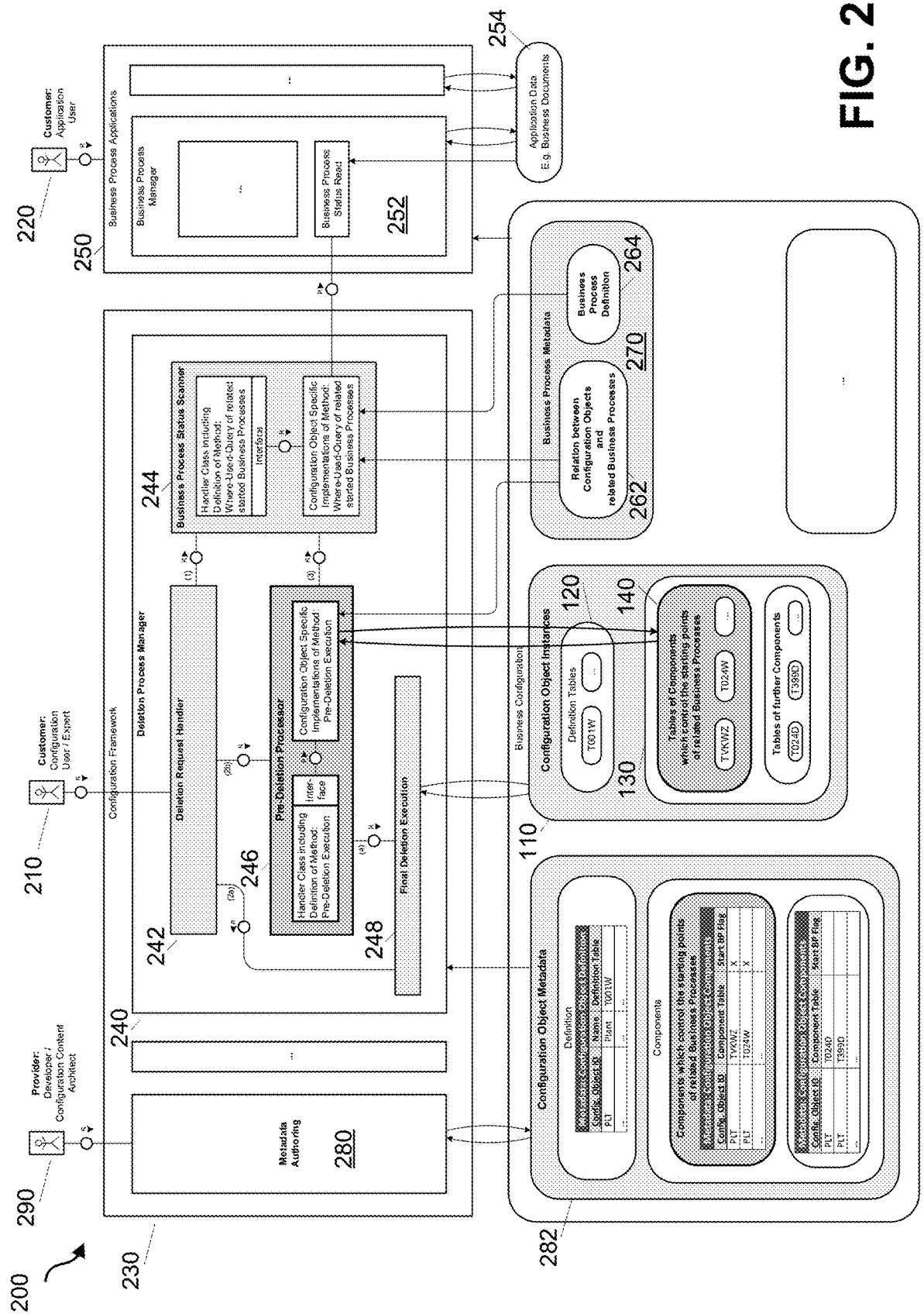
FIG. 2 is a diagram of a computing environment for deleting configuration objects.

FIG. 2 is an architecture diagram 200 illustrating an environment for the deletion of configuration objects. Such an environment can include a configuration framework 230 that is accessible by a configuration user/expert 210 (i.e., a computing device utilized by such an individual). The configuration framework can include a deletion process manager 240 which acts to selectively delete configuration objects. The configuration framework 230 can interact with various business process applications 250 which, in turn, are accessible by an application user 220 (i.e., a computing device utilized by such an individual). The business process applications 250 can include a business process manager 252 which can manage or otherwise monitor the execution of a business process. Further, the business process applications 250 can interface with or otherwise use application data 254 such as business documents which can be stored locally or remotely in a database or other data store. Further, providers 290 can also access a metadata authoring component 280 which can be used to generate, access, or otherwise modify or consume metadata related to a configuration object 282. Elements that are referenced by " . . . " refer to other components that can optionally form part of the various illustrated components.

The configuration object 282 metadata can take various forms. In particular, configuration objects are metadata because, through configuration objects, the configuration data (i.e., configuration data tables, etc.) are structured with respect to use cases as consistent copy of configuration or consistent deletion of configuration. Every configuration object can have exactly one definition configuration data table and any number of dependent configuration tables, which are called configuration object components.

The instances of the configuration object are the data in the configuration data tables. Therefore, as on example. the configuration object PLT (Plant) has the Definition Table T001W as defined in the configuration object Metadata. In addition, the instances of configuration object PLT are the records in table T001W and the corresponding records in the configuration tables which are defined in the configuration object components (e.g., the records in the configuration tables TVKWZ, T024W, T024D, T399D, etc.).

The deletion process manager can include a deletion request handler 242 which oversees the deletion of configuration objects 110 which, for example, can occur at the request of the configuration user 210. When such a request is received, the request handler 242 in combination with a pre-deletion processor 246 can access a business process status scanner 244 to see if there are any actively executing business processes utilizing the particular configuration object 110. A final deletion execution module 248 can cause the configuration object 110 to be deleted once a determination has been made that such configuration object 110 can be deleted (as described in further detail below with regard to FIG. 3). Additional information can be used by the pre-deletion processor 246 and the business process scanner including, for example, business process metadata 270. The business process metadata 270 can include, for example, relationship information between the configuration object 110 and related business processes 262 using, for example, a business process definition 264.

Figure 3:
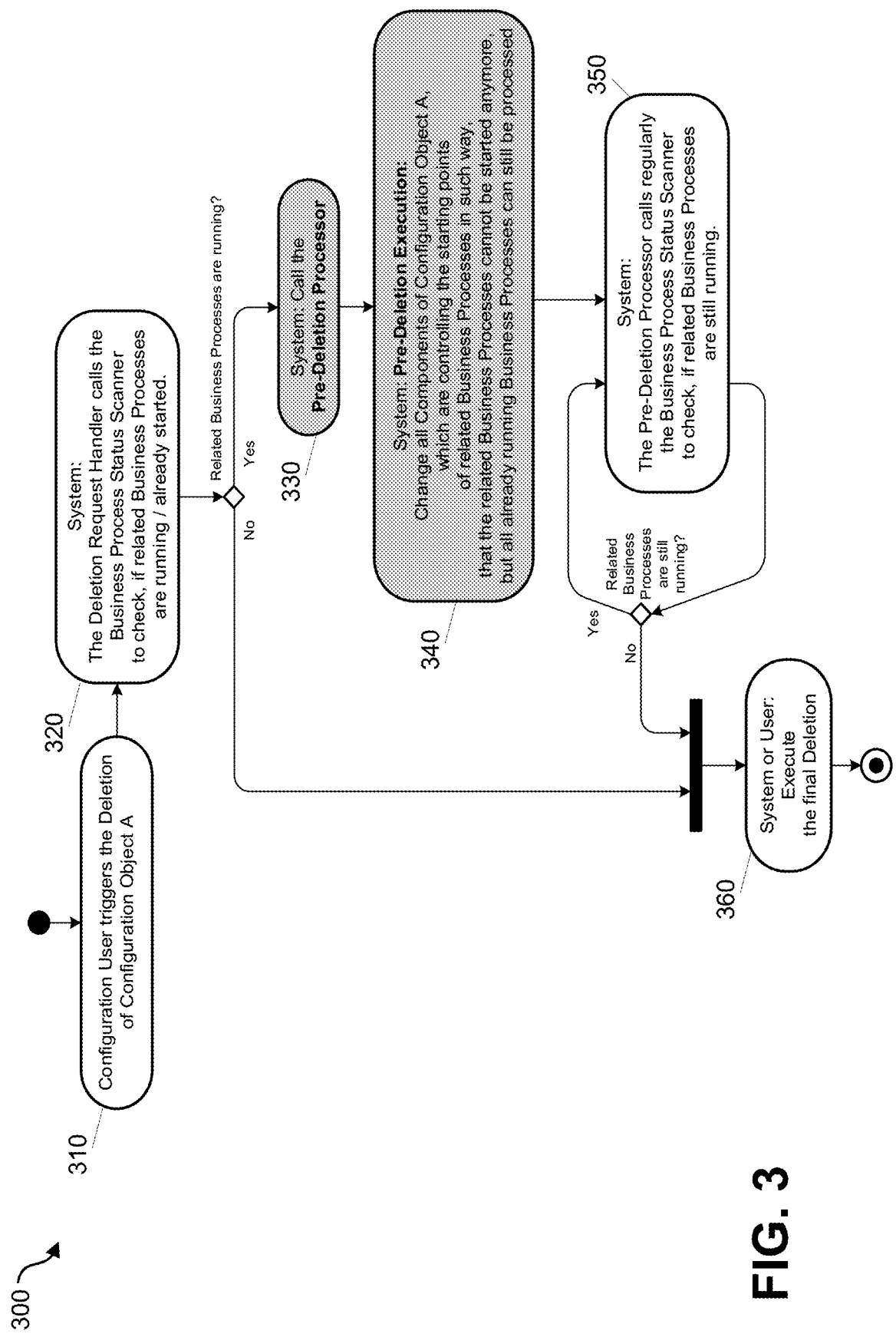
FIG. 3 is a first process flow diagram illustrating deletion of configuration objects.

FIG. 3 is a process flow diagram 300 illustrating deletion of a configuration object in which, at 310, a configuration user triggers the deletion of a configuration object A. Thereafter, at 320, the deletion request handler calls the business process status scanner to check if any related business process are currently executing. If related processes are still running, then at 330, the pre-deletion processor can be called. The pre-deletion execution, at 340, can change all components of configuration object A which are controlling the starting points of the related business processes so that subsequent business processes cannot be initiated while currently executing business processes can continue. After such time, at 350, the pre-deletion processor periodically calls the business process scanner to check if there are any related processes still running. If there are no actively executing business processes (either as determined at 320 or at 350), then the configuration object A, at 360, can be deleted.

Figure 4:
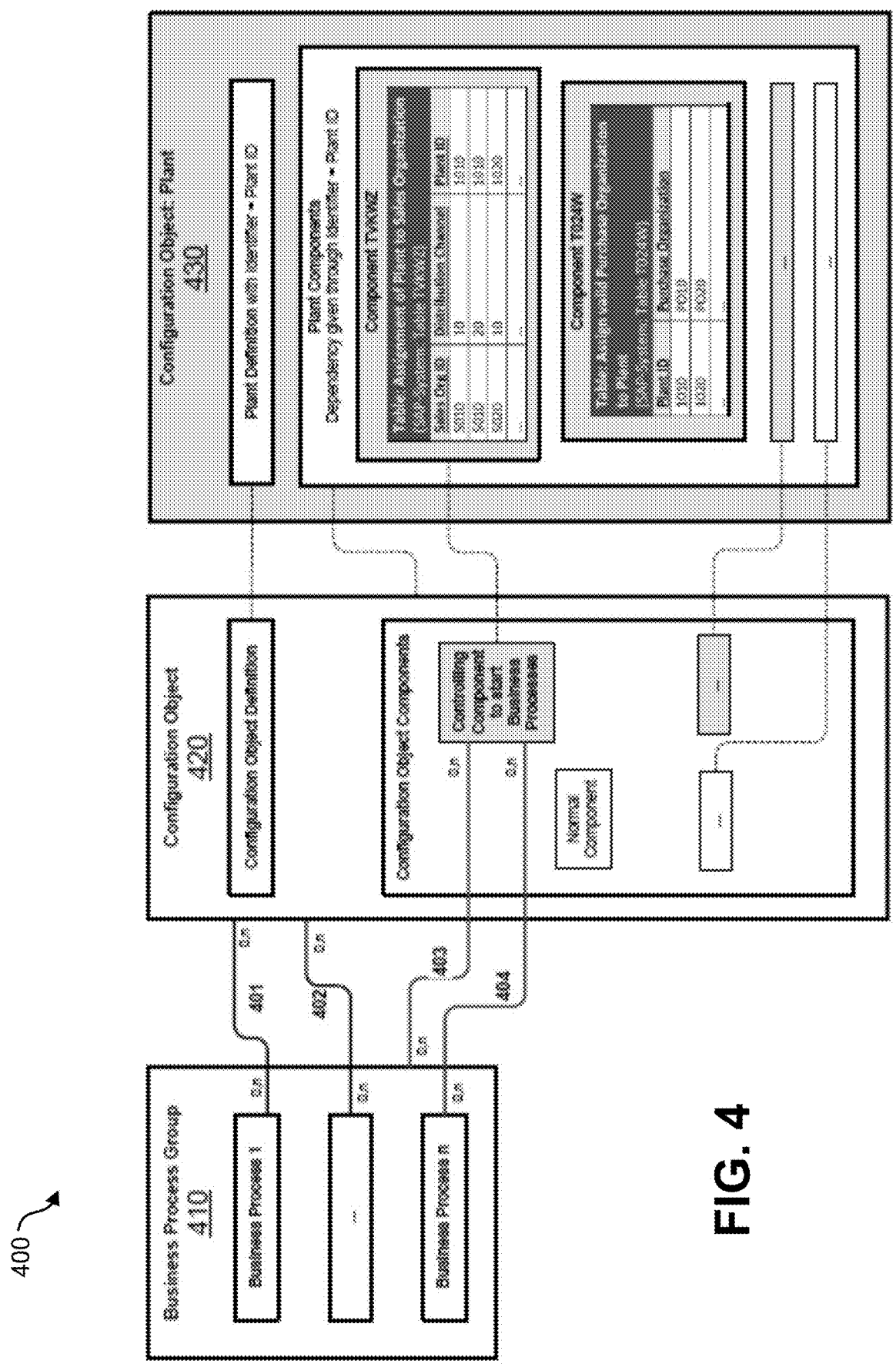
FIG. 4 is a diagram illustrating relationships between configuration objects and processes.

FIG. 4 is a diagram 400 illustrating relations among a business process group 410, a configuration object 420, and an example configuration object 430. Relations 401 and 402 can be characterized as general relations between configuration objects 420 and business processes within the business process group 410 for which the behavior is influenced by the configuration object 420 (including the corresponding configuration components) and for which there is at least one configuration object component which controls the starting point of the business process. If a business process group is assigned to a component, then this assignment is valid for all business processes contained within such group. Configuration object components, which control starting points of business processes, are important, because an appropriate manipulation of this configuration (e.g., deleting the corresponding record in a configuration table, etc.) prevents the starting of new business processes for the given configuration object (or in context of the given configuration object) without disturbing already running business processes for the given configuration object.

There can additionally be special relation 403, 404 for managing pre-deletion of configuration objects. These relations 403, 404 are between configuration objects components and those business processes for which the starting point of the business process is controlled by this Component.

Figure 5:
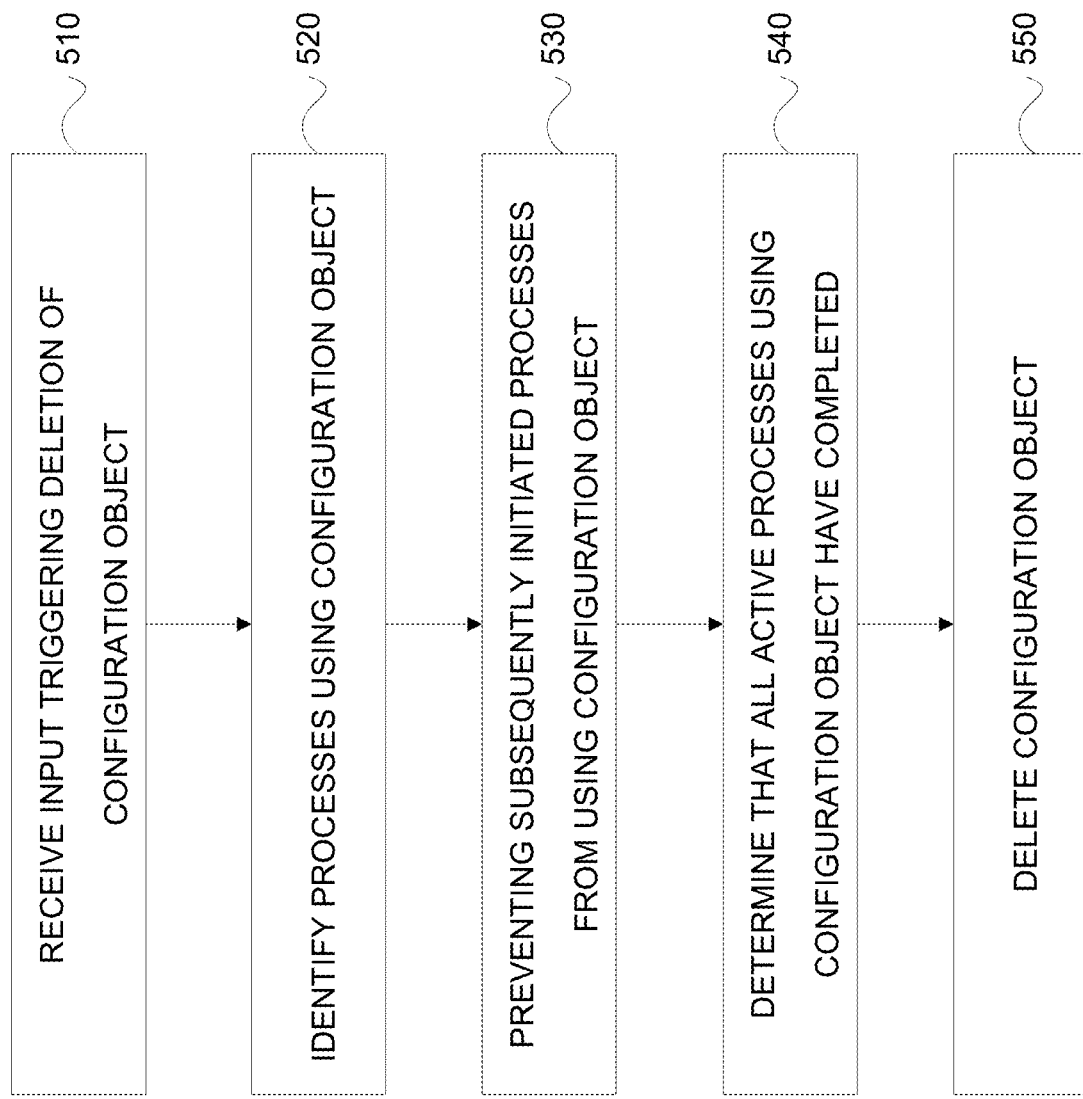
FIG. 5 is a second process flow diagram illustrating deletion of configuration objects.

FIG. 5 is a process flow diagram 500 in which, at 510, user-generated input triggering deletion of a configuration object used by a computing system. Thereafter, at 520, all active processes using the configuration object are identified. In response, at 530, subsequently initiated processes are prevented from using the configuration object. It is later determined, at 540, when all active processes using the configuration object have completed so that, at 550, the configuration object can be deleted.

Figure 6:
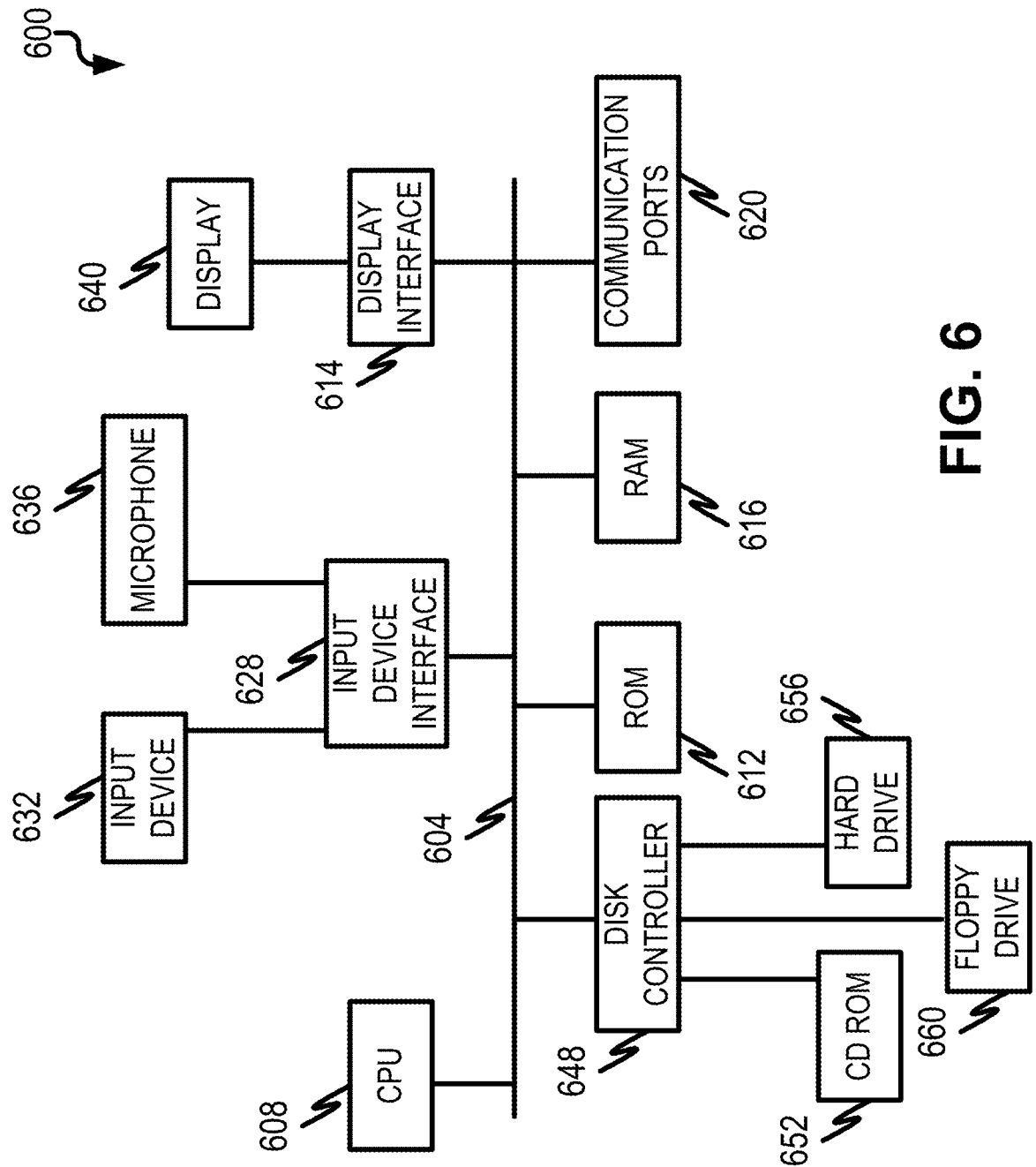
FIG. 6 is a diagram of a computing device for implementing aspects described and illustrated herein.

FIG. 6 is a diagram 600 illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 516, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 to the user and an input device 632 such as keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. The input device 632 and the microphone 636 can be coupled to and convey information via the bus 604 by way of an input device interface 628. Other computing devices, such as dedicated servers, can omit one or more of the display 640 and display interface 614, the input device 632, the microphone 636, and input device interface 628.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of or" one or more of may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing device, the method comprising:
    receiving user-generated input triggering deletion of a configuration object used by a computing system, the configuration object specifying how processes are executed by the computing system and which data objects are used by such processes,
    wherein the configuration object comprises a plurality of configuration components,
    wherein at least one of the plurality of configuration components is used as a starting point for processes;
    identifying all active processes using the configuration object;
    modifying the configuration object to prevent subsequently initiated processes from using the configuration object while allowing the identified active processes to continue to execute;
    determining when all active processes using the configuration object have completed; and
    deleting, in response to the determining, the configuration object.

2. The method of claim 1, wherein the preventing subsequently initiated processes from using the configuration object comprises:
    changing the at least one of the plurality of configuration components used as a starting point for processes to prevent further processes from initiating.

3. The method of claim 1 further comprising:
periodically calling a process scanner to determine whether any of the active processes are still executing.

4. The method of claim 3, wherein the configuration object is deleted when it is determined that there are no active processes.

5. The method of claim 1, wherein the computing system comprises a plurality of computers and at least one database.

6. The method of claim 1, wherein the identifying, preventing, and determining form part of a pre-deletion phase is provided, in which it is guaranteed that no related processes can be started and that all actively executed processes can be finalized.

7. The method of claim 1, wherein the identifying, preventing, determining, and deleting are executed by a configuration framework.

8. The method of claim 7, wherein the configuration framework comprises a deletion process manager that selectively deletes the configuration object.

9. The method of claim 8, wherein the configuration framework comprises a business process manager to manage and monitor the execution of the processes.

10. A system comprising:
at least one data processor; and
memory storing instructions which, when executed by the at least one data processor, result in operations comprising:
receiving user-generated input triggering deletion of a configuration object used by a computing system, the configuration object specifying how processes are executed by the computing system and which data objects are used by such processes,
wherein the configuration object comprises a plurality of configuration components,
wherein at least one of the plurality of configuration components is used as a starting point for processes;
identifying all active processes using the configuration object;
modifying the configuration object to prevent subsequently initiated processes from using the configuration object while allowing the identified active processes to continue to execute;
determining when all active processes using the configuration object have completed; and
deleting, in response to the determining, the configuration object.

11. The system of claim 10, wherein the preventing subsequently initiated processes from using the configuration object comprises:
changing the at least one of the plurality of configuration components used as a starting point for processes to prevent further processes from initiating.

12. The system of claim 10, wherein the operations further comprise:
periodically calling a process scanner to determine whether any of the active processes are still executing.

13. The system of claim 12, wherein the configuration object is deleted when it is determined that there are no active processes.

14. The system of claim 10 further comprising at least one database.

15. The system of claim 10, wherein the identifying, preventing, and determining form part of a pre-deletion phase is provided, in which it is guaranteed that no related processes can be started and that all actively executed processes can be finalized.

16. The system of claim 10, wherein the identifying, preventing, determining, and deleting are executed by a configuration framework.

17. The system of claim 16, wherein the configuration framework comprises a deletion process manager that selectively deletes the configuration object.

18. The system of claim 17, wherein the configuration framework comprises a business process manager to manage and monitor the execution of the processes.

19. A non-transitory computer program product storing instructions which, when executed by at least one data processor forming part of at least one computing device, result in operations comprising:
receiving user-generated input triggering deletion of a configuration object used by a computing system, the configuration object specifying how computer-implemented business processes are executed by the computing system across both on-premise computing devices and cloud-based computing devices and which data objects are used by such business processes,
wherein the configuration object is comprised of a plurality of configuration components,
wherein at least one of the plurality of configuration components is used as a starting point for business processes;
identifying all active business processes using the configuration object;
modifying the configuration object to prevent subsequently initiated business processes from using the configuration object while allowing the identified active business processes to continue to execute, the modifying changing the at least one of the plurality of configuration components used as a starting point for business processes to prevent further business processes from initiating,
determining when all active business processes using the configuration object have completed; and
deleting, in response to the determining, the configuration object.

20. The computer program product of claim 19, wherein the operations further comprise:
periodically calling a process scanner to determine whether any of the active business processes are still executing.

* * * * *